Aug. 11, 1970　　　　R. L. ALEXANDER　　　　3,523,316
ASSEMBLY FEEDER

Filed Nov. 6, 1967　　　　　　　　　　　　　4 Sheets-Sheet 1

INVENTOR
RAYMOND L. ALEXANDER

BY
Hood, Gust & Irish
ATTORNEYS

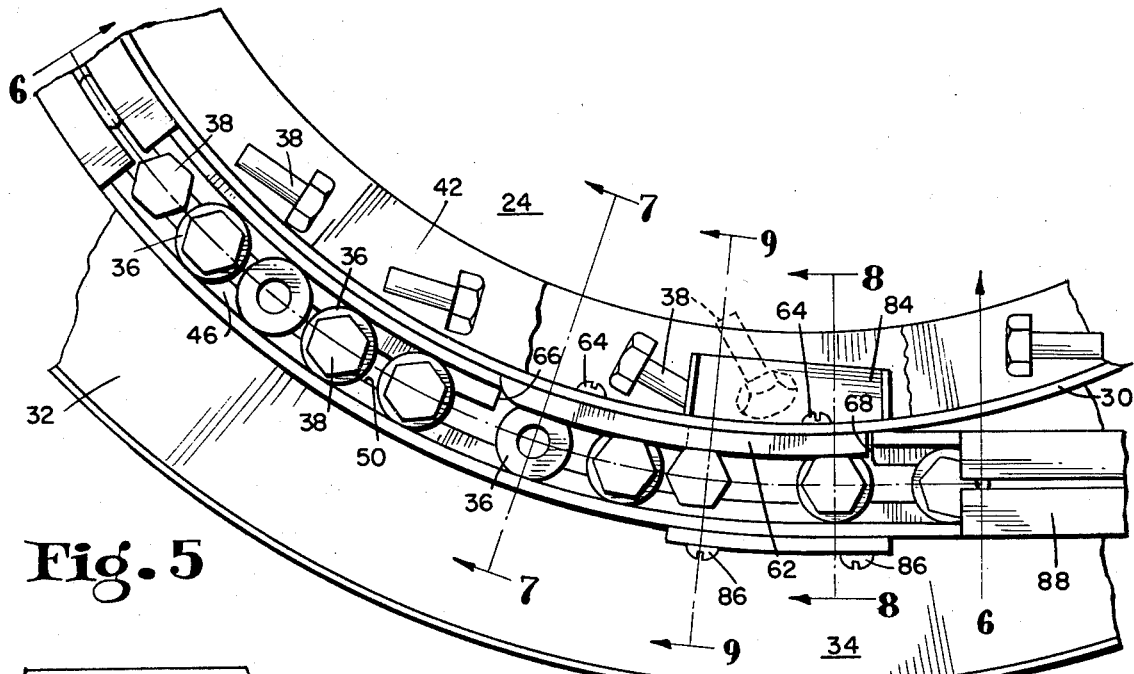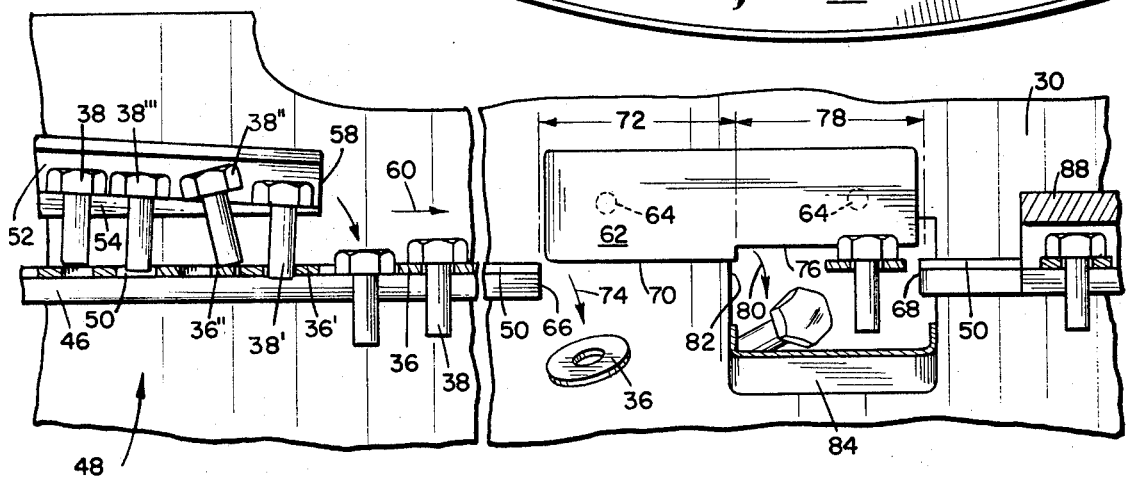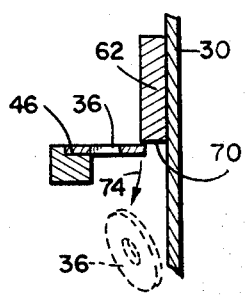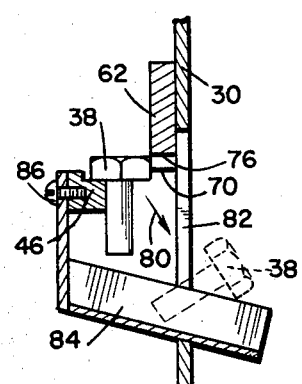

Aug. 11, 1970  R. L. ALEXANDER  3,523,316
ASSEMBLY FEEDER

Filed Nov. 6, 1967  4 Sheets-Sheet 4

INVENTORS
RAYMOND L. ALEXANDER
BY
Hood, Gust & Irish
ATTORNEYS

United States Patent Office 3,523,316
Patented Aug. 11, 1970

3,523,316
ASSEMBLY FEEDER
Raymond L. Alexander, Indianapolis, Ind., assignor to Moorfeed Corporation, Indianapolis, Ind., a corporation of Indiana
Filed Nov. 6, 1967, Ser. No. 680,676
Int. Cl. B23p 19/08
U.S. Cl. 10—155
9 Claims

ABSTRACT OF THE DISCLOSURE

An assembly feeder comprising hopper means and means for effecting vibratory motion of the hopper means, the hopper means comprising first receptacle means for receiving a supply of substantially identical first elements and second receptacle means for receiving a supply of substantially identical second elements, each of such first elements being proportioned and designed for mating engagement with any one of such second elements. First track means is provided for receiving and conveying first elements from the first receptacle means and second track means is provided for receiving and conveying second elements from the second receptacle means, the track means being connected to the hopper means for vibratory movement therewith. The exit end of the first track means is disposed above and in registry with a first portion of the second track means so that first elements carried on the first track means will be in a mating relationship with second elements carried on the second track means, whereby, when the hopper means and track means are vibrated, first elements leaving the first track means will be mated with single second elements on the second track means and such mated first and second elements will be moved along the second track means. Preferably, the track means are removably fastened to the hopper means so that different track means can be selectively used with the same hopper means. Also, preferably, detent means is associated with the second track means releasably to position single second elements in a position to be mated with a first element.

---

It is a primary object of my invention to provide a vibrator-type assembly feeder arranged to mate a first element with a second element and to deliver such mated elements for use in an assembly operation. My assembly feeder is ideally suited for mating male elements, such as screws, with female elements, such as washers, and conveying such mated male and female elements to a point where they are to be used in an assembly or machining operation.

Vibrator-type feeders are well known and have been used for many years for feeding various types of articles to machining, assembly or packaging operations. Such vibrator-type feeders will feed a series of articles to a given point and each article will be properly oriented for use at such point. See, for instance, the Balsiger et al. Pat. No. 2,609,914, issued Sept. 9, 1952.

Such prior art vibrator-type feeders conventionally comprise a base member, a circular hopper supported on the base member by means of a series of resilient members arranged circumferentially about the underside of the hopper and inclined from the base to the hopper in a counterclockwise direction or a clockwise direction. The bottom of the hopper is usualy high at the center and inclined downwardly and outwardly toward the upstanding side wall of the hopper. A track is arranged in the hopper with one of its ends merging into the floor of the hopper near the side wall so that articles can leave the floor and move along the track, the track generally being inclined upwardly about the inside surface of the side wall. The exit end of such track is generally disposed at the upper edge of the hopper and other conveying means, such as another track, is generally provided to receive articles from the exit end of the first-named track.

My assembly feeder is an improvement over prior art feeders because two separate receptacles are provided for receiving respectively two different types of articles, one type of which is proportioned and designed to be mated with the other type; track means is arranged to receive the articles from each receptacle and to mate single articles from one receptacle with single articles from the other receptacle and to deliver such mated articles to a point where they can be used; and detent means is associated with the track means releasably to position single articles on one track means for engagement with single articles on the other track means.

Another object of my invention is to provide detent means associated with such second track means and arranged releasably to position washers for engagement by screws carried on such first track means.

Still another object of my invention is to provide such track means which are removably mounted on the hopper means. Thus, a single hopper means can be adapted to handle screws and washers of different size merely by providing a selection of different sized track means.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 5 is an enlarged, fragmentary top view of the assembly feeder showing the manner in which unmated screws and washers are dropped from the track carrying the mated screws and washers;

FIG. 6 is a fragmentary, sectional view taken from FIG. 5 generally along the line 6—6 and showing how screws leaving one track are engaged with washers carried on another track and the manner in which unmated washers and screws are dropped back into their respective receptacles;

FIG. 7 is a fragmentary, sectional view taken from FIG. 5 generally along the line 7—7;

FIG. 8 is a fragmentary, sectional view taken from FIG. 5 generally along the line 8—8;

FIG. 9 is a fragmentary, sectional view taken from FIG. 5 generally along the line 9—9;

Figure 1:
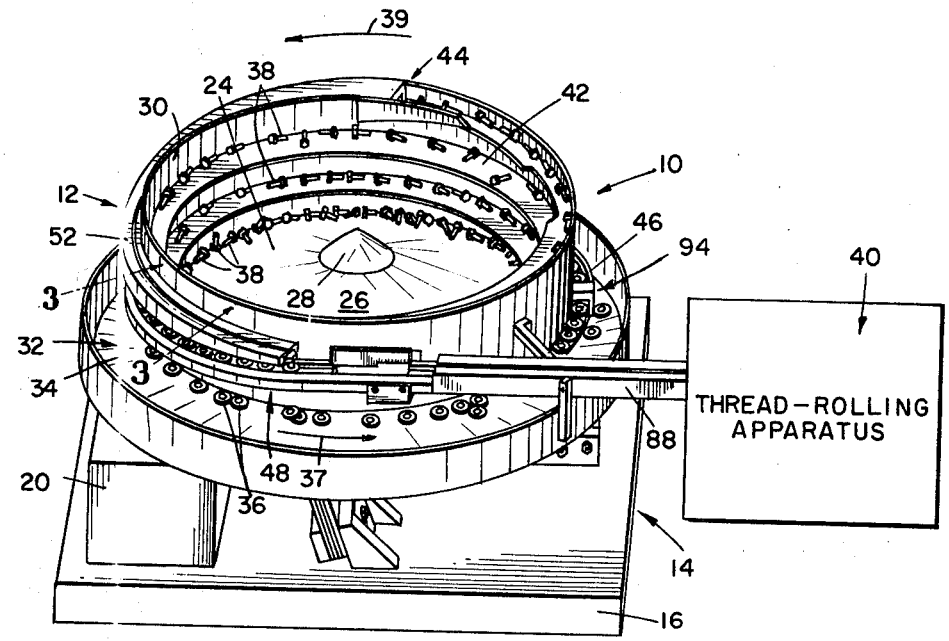
FIG. 1 is a perspective view of a vibrator-type assembly feeder arranged to mate screws with washers.

Referring now particularly to the form of invention shown in FIGS. 1–9 of the drawings, it will be seen that the illustrated assembly feeder 10 comprises a hopper means 12 mounted on a base unit 14, the feeder, hopper means and base unit being indicated generally by their respective reference numerals. The base unit 14 comprises an upper frame 15 which is connected to a lower frame 16 by means of resilient members 18 as clearly seen in FIG. 2. A driver 20 is mounted on the lower frame 16 and is drivingly connected to the upper frame 15 by means such as the illustrated screws 22. The driver 20 and the resilient members 18 are conventionally arranged so that, when the driver 20 is energized, the upper frame 15 is vibrated and, consequently, the hopper means 12 mounted on the upper frame 15 is vibrated. Such means for producing vibratory motion of a generally circular hopper means is well known and need not be discussed, in detail, in this description.

In the illustrative embodiment, the hopper means 12 comprises an upright, generally cylindrical bowl 24 having a bottom wall 26 raised at its center 28 and a side wall 30; and an annular pan 32 disposed peripherally about the bowl 24, the pan 32 having a bottom wall 34 which preferably slopes inwardly toward the side wall 30. When washers 36 or the like are dumped into the pan 32 and the hopper means 12 is vibrated, the washers will tend to move inwardly toward and peripherally about the outside surface of the side wall 30 as suggested by the arrow 37. When screws 38 or the like are dumped into the bow 24 and the bowl is vibrated, the screws will tend to move radially outwardly toward and peripherally about the inside surface of the side wall 30 as suggested by the arrow 39.

It will be noted that I have illustrated the screws 38 without a threaded shank portion. The reason for this is that the assembly feeder 10 is ideally suited for mating unthreaded screws with washers and delivering such mated screw blanks and washers to a thread-rolling apparatus where the thread will be rolled to capture the washer on the screw. To facilitate this description, I have indicated a thread-rolling apparatus 40 adjacent the assembly feeder 10. It will be understood, of course, that the apparatus 40 is not a part of the present invention and need not be discussed, in detail, in this description. It will also be understood that I am not limited to mating screw-like elements with washer-like elements and that the assembly feeder may be used to bring together and to engage any two parts which are proportioned and designed for mutual engagement.

A first generally helical track 42 is disposed about the inside surface of the side wall 30 with the entrance end (not shown) of the track merging into the bottom wall 26 so that the screws 38 may leave the bottom wall 26 and move along the track 42. The track 42 is arranged so that, when the hopper means 12 is vibrated, the screws 38 will be elevated upwardly to the point indicated by the reference numeral 44 at the top edge of the side wall 30.

Figure 2:
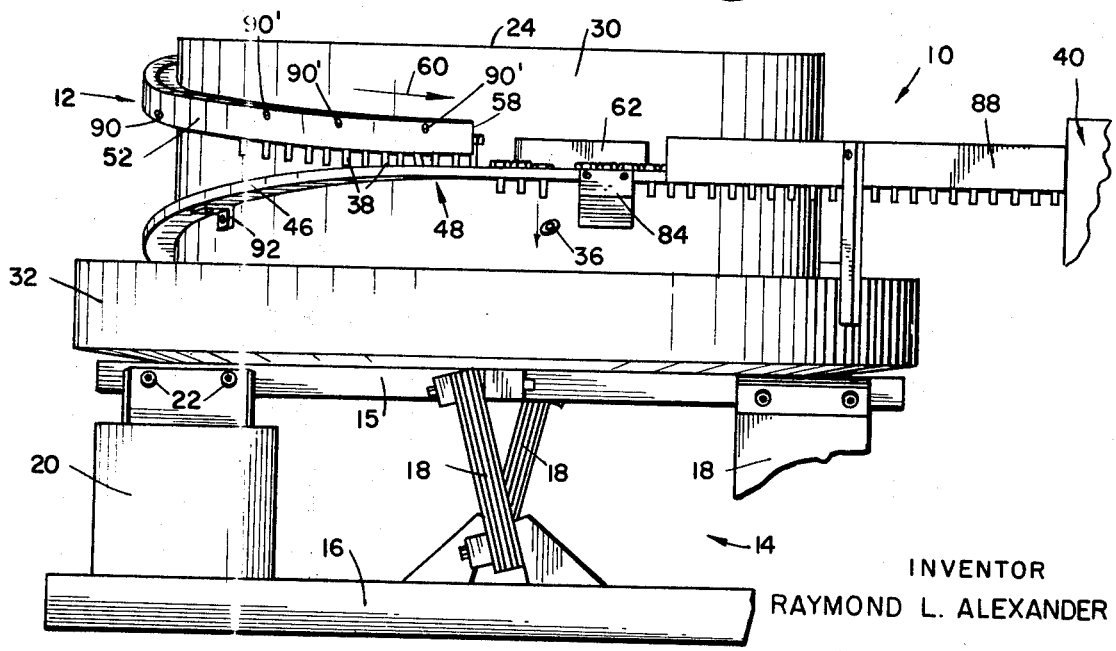
FIG. 2 is a side elevation of the assembly feeder showing the hopper means and means for effecting a vibratory movement of the hopper means.
Figure 10:
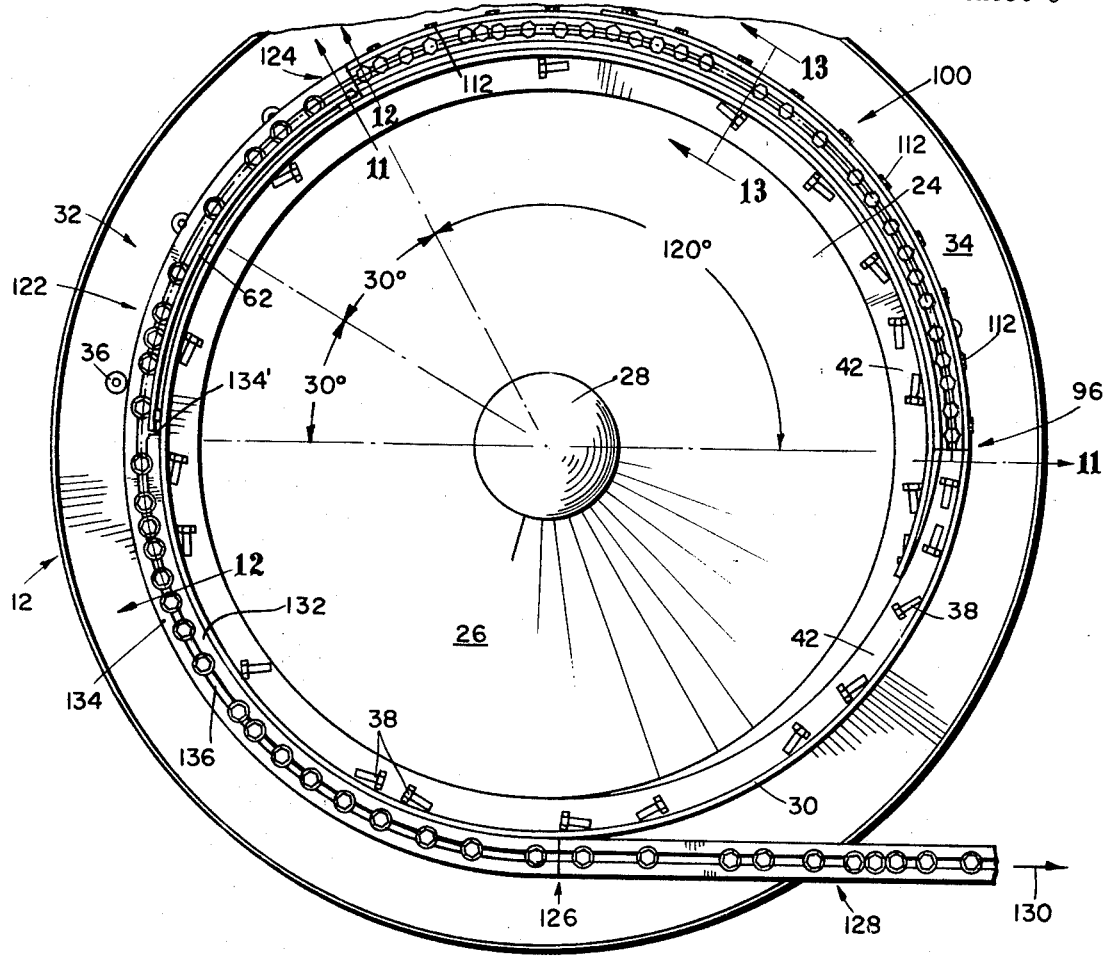
FIG. 10 is a plan view of a modified form of a vibrator-type assembly feeder embodying the concepts of my invention.

A second track 46 is generally helically disposed about the outside surface of the side wall 30, the entrance end of this track 46 merging with the bottom wall 34 of the pan 32 so that, when the hopper means 12 is vibrated, washers 36 will move upwardly onto and along the track 46. The track 46 is arranged to elevate the washers to the point indicated generally by the reference numeral 48 on the outside surface of the side wall 30. Referring to FIGS. 1 and 2, it will be seen that the track 46 extends generally horizontally from the point 48 to the thread-rolling apparatus 40.

As shown in FIGS. 5 and 6, the track 46 is provided with a longitudinally extending, centrally located slot 50 through which the shank portions of the screws 38 extend. This slot 50 extends from the point 48 to the thread-rolling apparatus 40.

Figure 4:
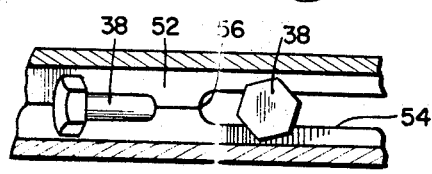
FIG. 4 is a fragmentary, sectional view taken from FIG. 3 generally along the line 4—4.
Figure 3:
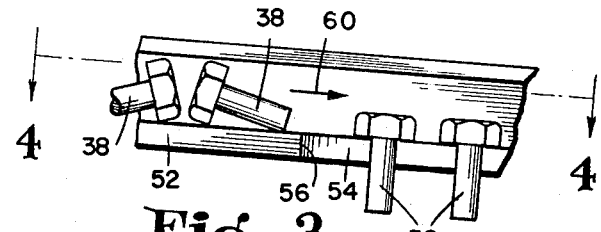
FIG. 3 is an enlarged, fragmentary, sectional view taken from FIG. 1 generally along the line 3—3.

A third track 52 is provided for conveying the screws 38 from the point 44 at the upper edge of the wall 30 to a point just above the point 48 on the track 46. This track 52 extends peripherally about a portion of the side wall 30 and inclines downwardly from the point 44 to the point 48. Referring to FIGS. 3 and 4, it will be seen that the track 52 is provided with a centrally-located slot 54 extending from the point 56 through the exit end 58, this slot 54 being wider than the diameter of the shank portions of the screws 38 and narrower than the head portions of the screws so that screws moving in the direction of the arrow 60 (FIG. 3) will have their shank portions extending downwardly. The exit end portion 58 of the track 52 is disposed above and in registry with the portion of the track 46 adjacent the point 48 so that the shank portions of the screws 38 carried on the track 52 will be in alignment with and extend through openings in the washers 36 whereby, when the hopper means 12 is vibrated, screws 38 leaving the exit end 58 of the track 52 will drop downwardly into mating engagement with washers 36 carried on the track 46. The manner in which a screw 38 is mated with a washer 36 is clearly shown in FIG. 6.

Referring to FIG. 6, it will be seen that the shank portion of the screw 38' is extending through the opening in the washer 36' so that, as the screw 38' and washer 36' move in the direction of the arrow 60, the screw 38' will drop from the exit end 58 of the track 52 to be mated with the washer 36'. It will be apparent, however, that in some cases, a screw 38 will not be properly aligned with a washer 36 so that the screw and washer can be mated. In FIG. 6, it will be seen that the screw 38'' is not properly registered with the opening in the washer 36'' and, therefore, when the screw 38'' drops from the exit end 58, it will not be mated with the washer 36''. Similarly, the screw 38''' is not properly aligned with and will not be mated with any washer 36.

Since it is my intention to deliver only mated screws 38 and washers 36, I have provided means for dropping unmated washers 36 into the pan 32 and unmated screws 38 into the bowl 24.

In order to drop unmated washers 36 and screws 38 from the track 46, I have mounted a lateral support member 62 on the side wall 30 by means such as the screws 64 to extend alongside of the track 46 and I have cut away the side of the track 46 adjacent the member 62 as shown in FIGS. 5 and 6 to 9. Specifically, I have cut away the portion of the track 46 radially inwardly of the slot 50 between the points 66 and 68 adjacent the forward and rear ends, respectively, of the member 62.

The lower edge 70 of the forward portion 72 of the member 62 is disposed above the track 46 at a height which is greater than the thickness of a washer 36 (FIG. 7) so that, when an unmated washer 36 moves by the portion 72, the unmated washer 36 will not be laterally supported by the member 62 and will fall downwardly as indicated by the arrow 74 into the pan 32. The edge 70 is, however, disposed above the track 46 at a height which is less than the thickness of a head portion (FIG. 9) of a screw 38 so that an unmated screw moving by the portion 72 will be laterally supported by the member 62 and will not fall downwardly into the pan 32.

The lower edge 76 of the rear end portion 78 of the member 62 is disposed above the track 46 at a height which is greater than the thickness of the head portion of a screw 38 (FIG. 9) so that an unmated screw 38 moving by the portion 78 will not be laterally supported by the member 62 and will fall downwardly as indicated by the arrow 80. The edge 76 is, however, disposed above the track 46 at a height which is less than the combined thickness of a screw 38 head portion and a washer 36 (FIG. 8) so that mated screws 38 and washers 36 will be laterally supported by the member 62 and will not fall from the track 46.

In order to convey unmated screws 38 from the track 46 back into the bowl 24, I have cut an opening 82 into the side wall 30 just below the end portion 78 and have mounted a chute 84 in the opening 82 to extend downwardly into the bowl 24. The chute 84, the outer end of which is connected to the track 46 by means such as the illustrated screws 86, is arranged to catch unmated screws 38 falling from the track 46 to convey such screws downwardly into the bowl 24.

In the illustrative embodiment of FIGS. 1-9, the portion of the track 46 extending between the point 68 and the thread-rolling apparatus 40 is provided with a cover, such as that indicated by the reference numeral 88. It will be apparent that, in some cases, the feeder assembly 10 may be a substantial distance from the thread-rolling apparatus 40 and that additional conveyor means, not shown, may be provided to carry mated screws 38 and washers 36 from the end of the track 46 to the apparatus 40.

Preferably, the track 52 and portions of the track 46 are removably fastened to the side wall 30 so that tracks of different size can be selectively assembled on the hopper mean 12 to adapt the assembly feeder 10 to feed various sizes of screws 38 and washers 36. The track 52, which extends from the point 44 to the point 48 (FIG. 1) may be fastened to the side wall 30 by means such as the illustrated screws 90. The screws indicated by the reference numeral 90' extend through the track 52 above the heads of the screws 38. The track 46 may be removably fastened to the side wall 30 by means such as the bracket 92. Since the track 46 extends from the point 94 (FIG. 1), the entrance end of the track 46, all the way around the bowl 24 to the thread-rolling apparatus 40, it may be desirable to break the track 46 into two or more sections, each of which can be removably fastened to the side wall 30 by means such as the illustrated bracket 92.

Referring now to FIGS. 10-16, it will be seen that I have illustrated another embodiment of my invention, this embodiment differing from the embodiment of FIGS. 1-9 in that a different removable track structure is provided. In the description of this latter embodiment, like reference numerals indicate like parts.

In the embodiment of FIGS. 10-16, the screws 38 leave the track 42, i.e., the track arranged peripherally about the interior of the side wall 30, at the point indicated generally by the reference numeral 96. Likewise, the washers 36 leave a track 98 at the point 96, which track 98 is only partially shown in FIG. 14. The track 98 is arranged to receive the washers 36 from the pan 32 and elevate the washers 36 to the point 96. Thus, the track 98 corresponds to the entrance end of the track 46 discussed in conjunction with FIGS. 1-9.

Figure 13:
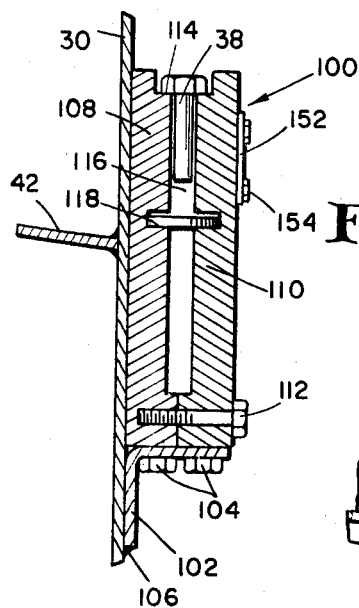
FIG. 13 is an enlarged, fragmentary, sectional view taken from FIG. 10 generally along the line 13—13 and showing the preferred removable track structure.

A track unit, indicated generally by the reference numeral 100, is arranged to extend peripherally about the side wall 30 approximately 120° from the point 96, the track unit 100 being supported on and fastened to brackets 102, only one of which is shown in FIG. 13, arranged peripherally about the side wall 30. In the illustrative embodiment, the track unit 100 is fastened to the brackets 102 by means such as the screws 104 (FIG. 13) and the brackets are welded to the side wall as indicated at the reference numeral 106.

The track unit 100 comprises an inner track member 108 and an outer track member 110, the members 108 and 110 being held together by means such as the illustrated screws 112.

The outer, upper edge of the member 108 and the inner, upper edge of the member 110 are rabbeted to define the track 114 for receiving screws 38 from the track 42. Referring to FIG. 13, it will be seen that the members 108 and 110 are arranged to provide a peripherally extending space 116 therebetween for receiving the shank portions of the screws 38, the head portions of the screws 38 being supported on the track 114.

Figure 14:
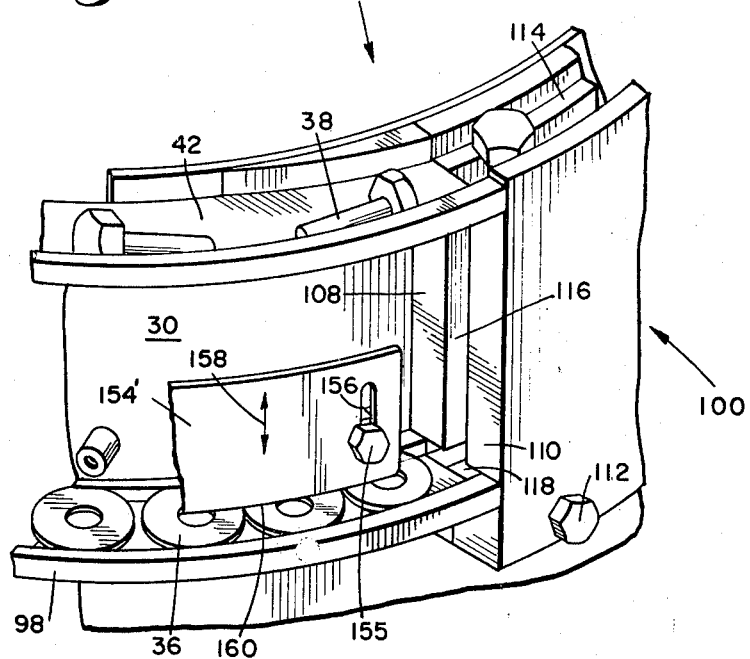
FIG. 14 is a fragmentary, perspective view showing the entrance end of the preferred track structure of FIG. 13.
Figure 15:
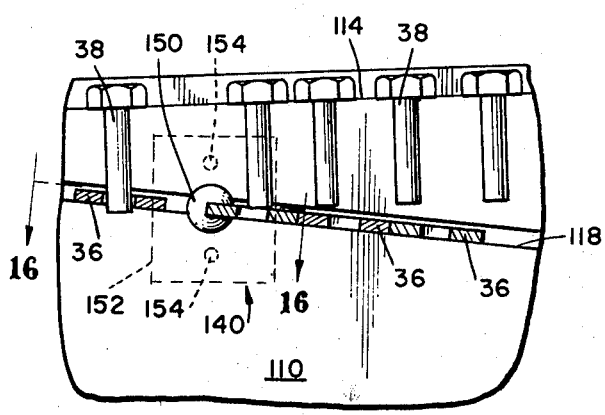
FIG. 15 is a fragmentary, sectional view of the preferred track structure showing the preferred manner in which screws are mated with washers.
Figure 16:
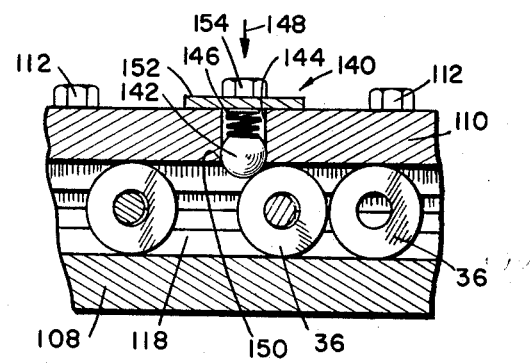
FIG. 16 is a fragmentary, sectional view taken from FIG. 15 generally along the line 16—16 and showing the preferred structure for releasably positioning washers for engagement by screws.

The outer side of the member 108 and the inner side of the member 110 are formed with grooves to define a track 118 for receiving the washers 36 from the track 98 (FIG. 14).

Figure 11:
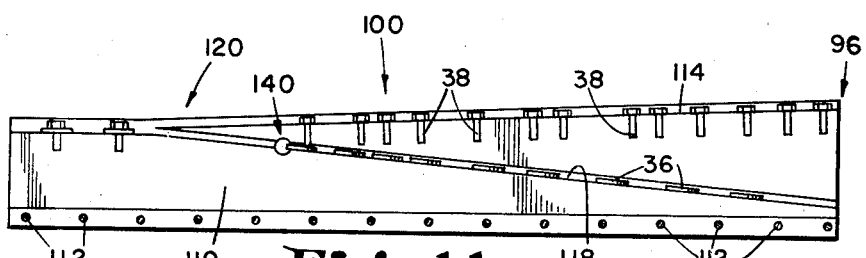
FIG. 11 is a sectional view taken from FIG. 10 generally along the line 11—11.
Figure 12:
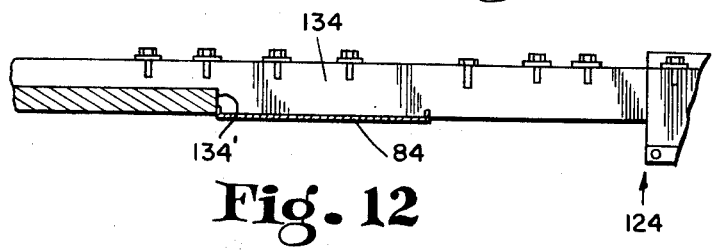
FIG. 12 is a fragmentary, sectional view taken from FIG. 10 generally along the line 12—12.

Referring to FIG. 11, which is a view of the inner side of the member 110, it will be seen that the track 114 slopes downwardly from the point 96 and that the track 118 slopes upwardly from the point 96 to merge with the track 114 at the point indicated generally by the reference numeral 120. Since the track 114 is disposed above and in registry with the track 118, screws leaving the track 114 mate with washers carried on the track 118. The manner in which the screws 38 will mate with washers 36 is discussed above in conjunction with FIG. 6.

It will be understood that the member 108 is formed to mate with the member 110 to provide the merging tracks 114 and 118.

Another track unit, indicated generally by the reference numeral 122, is arranged to extend peripherally about the side wall 30 from the exit end, indicated generally by the reference numeral 124, of the track unit 100. The track unit 122 is arranged to receive screws 38 and washers 36 from the track unit 100 and to carry such screws and washers to the point 126 where they are received by another track unit, indicated generally by the reference numeral 128, arranged to convey mated screws and washers in the direction of the arrow 130.

The track unit 122 comprises an inner track member 132 and an outer track member 134, both of which are supported by means (not shown) which may be similar to the brackets 102. The members 132 and 134 are spaced apart to provide the peripherally extending space 136 which receives the shank portions of the screws 38. The washers 36 and the head portions of the screws 38 are supported on the upper edges of the track members 132 and 134. A lateral support member 62 extends alongside a portion of the track unit 122 and the upper edge portion of the inner track member 132 adjacent the support member 62 is cut away. In the illustrative embodiment, the member 62 extends along a 60° portion of the track unit 122 between the point 134' (FIGS. 10 and 12) and the end 124 of the track unit 100. The lower edge of the first 30° portion (upstream portion) of the member 62 is arranged so that unmated washers 36 will not be laterally supported and will fall downwardly into the pan 32. The lower edge of the second 30° portion (downstream portion) of the member 62 is arranged so that unmated screws 38 will fall from the track unit 122 downwardly into a chute 84 (FIG. 12) leading into the bowl 24. It will be understood that the lateral support member 62 in the embodiment of FIGS. 10-16 serves the same function as the lateral support member 62 in the embodiment of FIGS. 1-9.

It will be apparent that, since the track units 100, 122 and 128 are removably fastened to the hopper means 12, a single hopper means and track units 100, 122 and 128 of various sizes can be supplied to a user. Thus, the user can use the same hopper means 12 and base unit, both of which are quite expensive, to mate screws and washers of various sizes.

In order to facilitate the mating of screws 38 with washers 36, a detent means, indicated generally by the reference numeral 140, is provided for releasably positioning the washers 36 on the track 118 for engagement by screws 38 carried on the track 114. In the illustrative embodiment, the detent means 140 comprises a ball-like detent member 142 carried in a radially extending opening 144 in the member 110 (FIG. 16) and a spring 146 arranged yieldably to urge the member 142 in the direction of the arrow 148. The inner end of the opening 144 is preferably formed with a slight in-turned lip for limiting the movement of the member 142 in the direction of the arrow 148. The member 142 and the spring 146 are held in the opening 144 by means such as the illustrated plate 152 which is fastened to the member 110 by the screws 154.

The spring 146 is calibrated so that the holding power of the detent means 140 is just sufficient to hold an unmated washer 36, but insufficient to hold a washer 36 which is mated with a screw 38. That is, the weight of the screw 38 is such that, when a screw 38 engages a washer 36 held by the detent 140, the screw 38 will drag the washer 36 past the member 142.

It will be understood that the spring 146 will be quite weak and will offer only sufficient resistance to position a washer 36. It will also be understood that the illustrative detent means 140 is just one of several possible means for releasably positioning the washers 36. For instance, a simple leaf spring provided with a detent portion may be mounted on the member 110 or the member 108 so that its detent portion is arranged releasably to engage and position the washers 36. Therefore, in this specification, the term "detent means" is to be construed as defining any suitable means for releasably positioning an element on one track for engagement by an element on another track.

Referring again to FIG. 14, it will be seen that I have provided a member 154' (only a fragment of which is shown) mounted on the side wall 30 by means such as two or more screws 155 (only one of which is shown) each extending through a vertically elongated slot 156. The member 154' is vertically adjustable in the direction of the arrow 158 by loosening the screws 155. The lower edge 160 is arranged to permit only one layer of washers 36 to leave the track 98 and enter the track 118.

What is claimed is:

1. An assembly feeder comprising hopper means and means for effecting a vibratory motion of said hopper means, said hopper means comprising an upright bowl for receiving a supply of substantially identical first elements, said bowl having side and bottom walls, and an annular pan for receiving a supply of substantially identical second elements, each of such first elements being proportioned and designed for mating engagement with any one of such second elements, said pan being disposed peripherally about said bowl and attached thereto for vibration therewith, first track means disposed in said bowl and mounted on and inclining upwardly about the inside surface of the side wall thereof, said first track means merging into the bottom of said bowl to receive first elements therefrom, second track means mounted on and inclining upwardly about the outside surface of said wall, said second track means merging into the bottom surface of said pan to receive second elements therefrom, and third track means mounted on and inclining downwardly about the outside surface of said side wall, the entrance end of said third track means being arranged to receive first elements from said first track means, the exit end of said third track means being disposed above and in registry with a first portion of said second track means so that first elements carried on said third track means will be in a mating relationship with second elements carried on said second track means, whereby, when said hopper means is vibrated, first elements leaving said third track means will be mated with single second elements on said second track means and such mated first and second elements will be moved along said second track means, means for removably fastening said third track means to said side wall and means for removably fastening a second portion of said second track means including said first portion to said side wall.

2. The assembly feeder of claim 1 wherein said third track means and said second portion of said second track means are defined by track surfaces formed in a pair of members extending peripherally about a portion of said side wall, one of said members being disposed radially outwardly of the other of said members, the track surfaces defining said third track means being formed in the inner side of said one member and the outer side of said other member and the track surfaces defining said second portion being formed in the inner side of said one member and the outer side of said other member, and fastening means arranged rigidly to hold said members together.

3. The assembly feeder of claim 1 further comprising detent means associated with said second track means and arranged releasably to position single second elements on said first portion for engagement by single first elements carried on said third track means.

4. The assembly feeder of claim 3 wherein said detent means comprises a detent element, and spring means for yieldably urging said detent element into the advancing path of said unmated second elements to arrest travel thereof, said spring means being so calibrated that the holding power of said detent means is sufficient to hold an unmated second element and insufficient to hold a mated pair of first and second elements.

5. The assembly feeder of claim 2 further comprising detent means associated with said second track means and arranged releasably to position single second elements on said first portion for engagement by single first elements carried on said third track means, one of said members being provided with a radially extending opening adjacent said first portion, said detent means comprising a detent member arranged for movement in said opening inwardly and outwardly toward and away from said second track means and spring means arranged yieldably to urge said detent member toward said second track means, said spring means being calibrated so that the holding power of said detent means is sufficient to hold an unmated second element and insufficient to hold a mated pair of first and second elements.

6. An apparatus for mating male elements with female elements, each of such male elements comprising a head portion and a shank portion and each of such female elements being provided with an opening for receiving such shank portions, said apparatus comprising hopper means and means for effecting a vibratory motion of said hopper means, said hopper means comprising an upright bowl for receiving a supply of such male elements, said bowl having side and bottom walls, and an annular pan for receiving a supply of such female elements, said pan being disposed peripherally about said bowl and attached thereto for vibration therewith, first track means disposed in said bowl and mounted on and inclining upwardly about the inside surface of the side wall thereof, said first track means merging into the bottom of said bowl to receive male elements therefrom, second track means mounted on and inclining upwardly about the outside surface of said side wall, said second track means merging into the bottom surface of said pan to receive female elements therefrom, third track means mounted on and inclining downwardly about the outside surface of said side wall, the entrance end of said third track means being arranged to receive male elements from said first track means, said third track means being arranged so that the shank portions of such male elements carried thereon extend downwardly, the exit end of said third track means being disposed above and in vertical registry with a first portion of said second track means so that such shank portions will extend downwardly through the openings in such female elements carried on said second track means, whereby, when said hopper means is vibrated, male elements leaving said third track means will drop into mating engagement with single female elements carried on said second track means and such mated male and female elements will be moved along said second track means, and detent means associated with said second track means and arranged releasably to position single female elements on said first portion for engagement by single male elements on said third track means.

7. The assembly feeder of claim 6 wherein said detent means comprises a detent element, and spring means for yieldably urging said detent element into the advancing path of said unmated second elements to arrest travel thereof, said spring means being so calibrated that the holding power of said detent means is sufficient to hold unmated female elements and insufficient to hold mated male and female elements.

8. The assembly feeder of claim 6 wherein said third track means and a second portion of said second track means which includes said first portion are defined by track surfaces formed in a pair of members extending peripherally about a portion of said side wall, one of said members being disposed radially outwardly of the other of said members, the track surfaces defining said third track means being rabbeted out of the inner upper edge of said one member and the outer upper edge of said other member and the track surfaces defining said second portion being formed in the inner side of said one member and the outer side of said other member, said members being arranged to define a peripheral space for receiving such shank portions, and fastening means arranged rigidly to hold said members together.

9. An assembly feeder comprising hopper means and means for effecting a vibratory motion of said hopper means, said hopper means comprising first receptacle means for receiving a supply of substantially identical first elements and second receptacle means for receiving a supply of substantially identical second elements, each of such first elements being proportioned and designed for mating engagement with any one of such second elements, first track means for receiving and conveying first elements from said said first receptacle means, second track means for receiving and conveying second elements from said second receptacle means, said track means being connected to said hopper means for vibratory movement therewith, the exit end of said first track means being disposed above and in registry with a first portion of said second track means so that first elements carried on said first track means will be in mating relationship with second elements carried on said second track means, whereby, when said hopper means and track means are vibrated to move such elements, respectively, along said track means, first elements leaving said first track means will be mated with single second elements on said second track means and such mated first and second elements will be moved along said second track means, the vibration of said track means being the sole means for moving such elements therealong, and detent means associated with said second track means and arranged releasably to position single second elements on said first portion for engagement by single first elements carried on said first track means, said detent means includes spring means for providing the holding power for releasably positioning such single second elements, said spring means being calibrated to provide a holding power sufficient to hold an unmated second element against the inertial forces produced by vibrating said track means and insufficient to hold a mated pair of first and second elements against inertial forces produced by vibrating said track means.

References Cited

UNITED STATES PATENTS

| 2,333,940 | 11/1943 | Kuehlman | 10—155 |
| 2,918,163 | 12/1959 | Willis | 10—162 |
| 3,114,159 | 12/1963 | Yoshikawa | 10—155 |
| 3,125,208 | 3/1964 | Secunda | 198—200 |

FOREIGN PATENTS

| 119,148 | 12/1958 | U.S.S.R. |
| 144,444 | 6/1961 | U.S.S.R. |

CHARLES W. LANHAM, Primary Examiner

E. M. COMBS, Assistant Examiner

U.S. Cl. X.R.

10—162; 29—208, 211

PO-1050
(5/69)

UNITED STATES PATENT OFFICE
CERTIFICATE OF CORRECTION

Patent No. 3,523,316     Dated    August 11, 1970

Inventor(s)  Raymond L. Alexander

It is certified that error appears in the above-identified patent and that said Letters Patent are hereby corrected as shown below:

Column 1, line 65, "usually" is misspelled.
Column 3, line 39, "bow" should be -- bowl --.
Column 5, line 30, "mean" should be -- means --.
Column 6, line 66, after "unit" but before the comma, insert -- 14 --.
Column 7, line 57 (Claim 1, line 17), after "said" (first occurrence) insert --  side  --.
Column 9, line  42, (Claim 9, line 10), delete "said" (first occurrence).

NOV. 3, 1970

(SEAL)
Attest:

Edward M. Fletcher, Jr.
Attesting Officer

WILLIAM E. SCHUYLER, JR.
Commissioner of Patents